Figure 1:
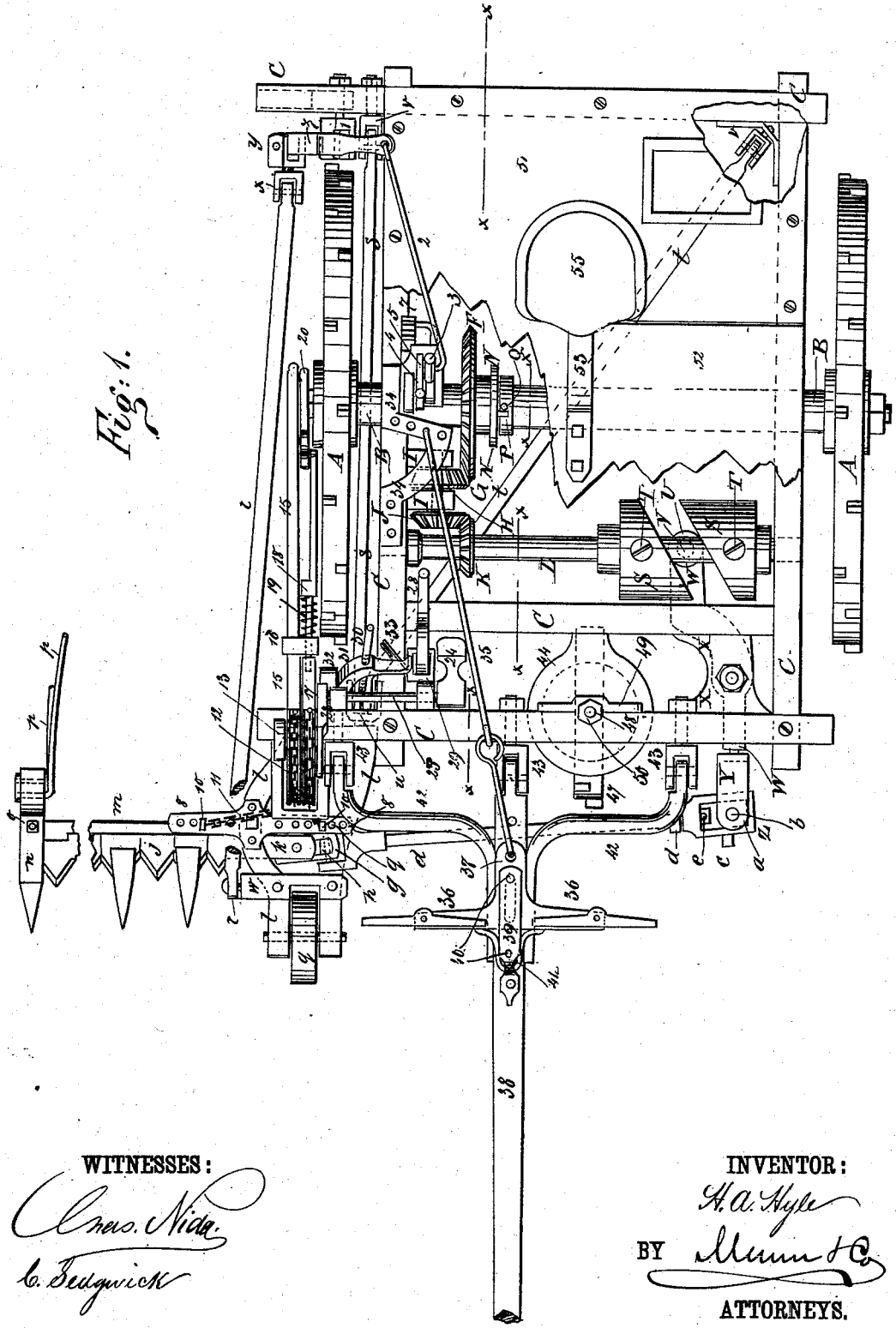

(Model.)

3 Sheets—Sheet 1.

H. A. HYLE.
MOWER AND REAPER.

No. 273,994. Patented Mar. 13, 1883.

WITNESSES:

INVENTOR:
H. A. Hyle
BY Munn & Co.
ATTORNEYS.

(Model.)
3 Sheets—Sheet 2.
H. A. HYLE.
MOWER AND REAPER.
No. 273,994. Patented Mar. 13, 1883.
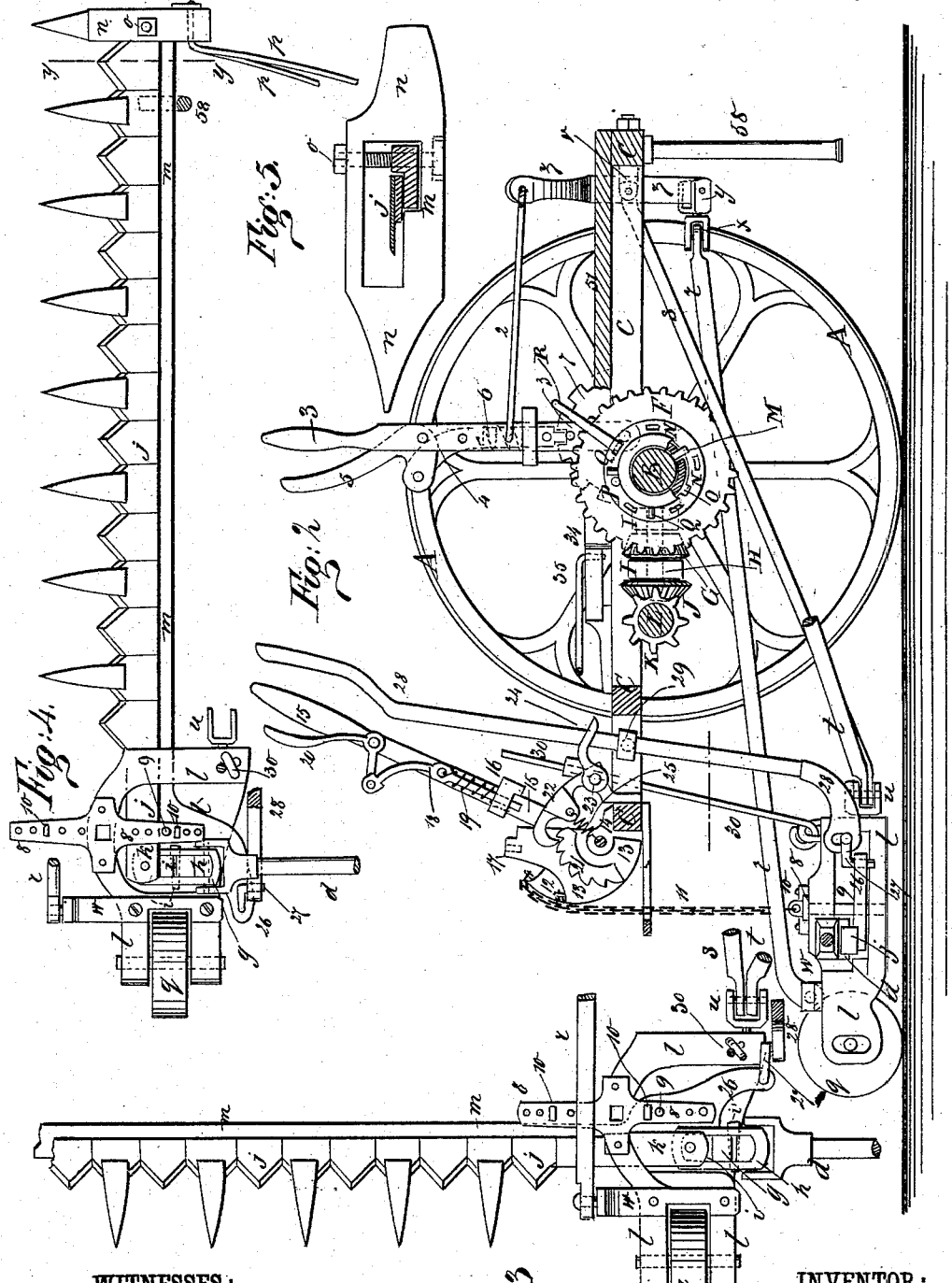
WITNESSES:
Chas. Nida.
C. Sedgwick.
INVENTOR:
H. A. Hyle
BY Munn & Co.
ATTORNEYS.

(Model.)
H. A. HYLE.
MOWER AND REAPER.
No. 273,994. Patented Mar. 13, 1883.
3 Sheets—Sheet 3
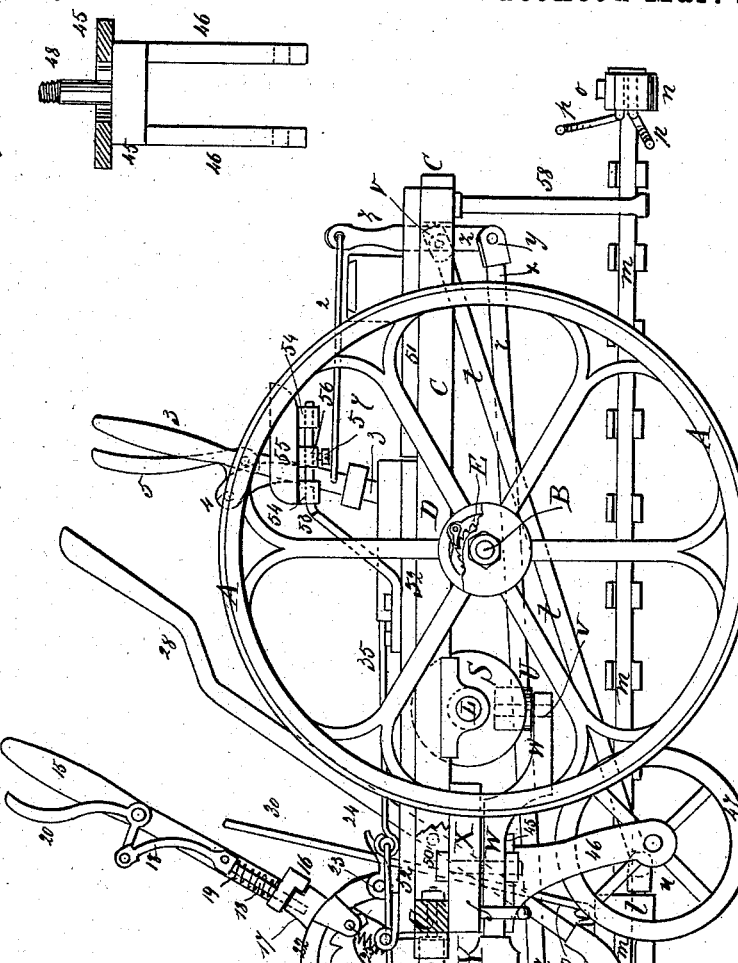
WITNESSES:
Chas. Nida.
C. Sedgwick
INVENTOR:
H. A. Hyle
BY Munn & Co
ATTORNEYS.
N. PETERS, Photo-Lithographer, Washington, D. C.

UNITED STATES PATENT OFFICE.

HENRY A. HYLE, OF REDWOOD, NEW YORK.

MOWER AND REAPER.

SPECIFICATION forming part of Letters Patent No. 273,994, dated March 13, 1883.

Application filed July 6, 1882. (Model.)

*To all whom it may concern:*

Be it known that I, HENRY A. HYLE, of Redwood, in the county of Jefferson and State of New York, have invented a new and useful Improvement in Mowers and Reapers, of which the following is a full, clear, and exact description.

Reference is to be had to the accompanying drawings, forming part of this specification, in which similar letters of reference indicate corresponding parts in all the figures.

Figure 1, Sheet 1, is a plan view of my improvement, parts being broken away. Fig. 2, Sheet 2, is a sectional side elevation of the same, taken through the broken line $xx$. Fig. 1. Fig. 3, Sheet 2, is a plan view of the cutter-bar and inner shoe, the cutter-bar being shown in working position. Fig. 4, Sheet 2, is a plan view of the cutter-bar and its shoes, the cutter-bar being shown swung back for transportation. Fig. 5, Sheet 2, is a sectional elevation of the cutter-bar, taken through the line $yy$, Fig. 4, and showing the outer shoe in side elevation. Fig. 6, Sheet 3, is a side elevation of the improvement shown with the cutter-bar in position for transportation, and with parts broken away. Fig. 7, Sheet 3, is a sectional side elevation of the caster-wheel standard and its bearing. Fig. 8, Sheet 3, is a sectional rear elevation of the caster-wheel standard. Fig. 9 is a sectional elevation of the seat, showing the spring.

The object of this invention is to promote convenience in controlling mowers and reapers when in operation, and to increase the efficiency and usefulness of said machines.

The invention consists in a mower or reaper constructed with various improved appliances for giving motion to the sickle-bar and adjusting the shoes and cutter-bar, as will be hereinafter fully described, and then pointed out in the claims.

A represents the drive-wheels of the machine, the axle B of which revolves in bearings attached to the frame C. The wheels A are connected with the axle B by pawls D and ratchet-wheels E, so that the said wheels will carry the said axle with them in their revolution when turning forward, but can be turned backward without turning the said axle.

The frame C can be made of wood or iron, and may be rectangular, as shown in the drawings, or in oblong form with four salient angles, as may be desired. The latter form is preferable when the frame is made of iron.

Upon the axle B, near the right-hand side of the frame C, is placed a large beveled-gear wheel, F, the teeth of which mesh into the teeth of a small beveled-gear wheel, G, attached to a short shaft, H. The shaft H revolves in bearings I, attached to the side bar of the frame C in front of the axle B.

To the forward end of the shaft H is attached a small beveled-gear wheel, J, the teeth of which mesh into the teeth of a small beveled-gear wheel, K, attached to the counter-shaft L. The counter-shaft L is placed parallel with the axle B, and its journals revolve in bearings attached to or formed in the side bars of the frame C.

The gear-wheel F is loose upon the axle B, and the inner end of its hub projects in tubular form, and is slotted longitudinally to receive a projection or pin, M, formed upon or attached to the axle B, so that the gear-wheel F will always be carried around by and with the axle B in its revolution, but can be moved upon the said axle to throw it into and out of gear with the gear-wheel G. The gear-wheel F is locked in either position by a ring, N, placed upon the hub of the said gear-wheel F in such a position that when the pin M is upon the inner side of the ring N the gear-wheel F will be out of gear with the gear-wheel G, and when the pin M is upon the outer side of the ring N the gear-wheel F will be in gear with the gear-wheel G.

In the inner or concave edge of the ring N is formed a radial slot, O, of sufficient depth to allow the projecting end of the pin M to pass through it, so that when the ring N has been turned to bring the slot O opposite the pin M the ring N and gear-wheel F can slide upon the axle B to throw the gear-wheel F into and out of gear with the gear-wheel G. The rotary movement of the ring N is limited by a pin, P, attached to it, and which strikes successively against two pins, Q, attached to the hub of the gear-wheel F, one of the said pins Q being so placed that when the pin P strikes against it the slot O will be directly opposite the pin M. The ring N is turned to lock and unlock the gear-wheel F by a lever, R, attached to the said ring, and which may be an extension of one of the pins P.

Upon the counter-shaft L is placed a cylinder, S, which is made in two parts, and is secured to the said shaft by set-screws T or other suitable means. The adjacent ends of the sections of the cylinder S are beveled, and the said sections are secured to the shaft L with the inclined faces of their adjacent ends parallel, as shown in Fig. 1, so that the space between the said ends will form a curve or cam-slot to receive the roller U, placed upon a pin, V, attached to the upper side of the inner end of the lever W. The lever W is pivoted to a support, X, attached to the frame C at its left-hand forward corner, as shown in Fig. 1.

Upon the forward end of the lever W is formed a round tenon, which passes through the base of a forked coupling-block, Y, and has a nut screwed upon its end, so as to swivel the said coupling-block to the end of the lever W.

Within the fork of the coupling-block Y is placed a slotted coupling-block, Z, within which are placed two half-bearings, a, between which passes a bolt, b, secured to the forked coupling-block Y. The half-bearings a are held against the bolt b by a wedge-key, c, passing through the sides of the slotted block Z, and having a nut screwed upon its end, so that the wear of the bearing-blocks can be taken up by tightening the said nut.

Through a hole in the end of the slotted coupling-block Z is passed a round tenon formed upon the end of the pitman d, and which is kept in place by a wedge-key, e, passing through the end of the said tenon, and having a nut screwed upon its end, so that the wear can be readily taken up. The forward end of the lever W is supported against the downward pressure of the end of the pitman d by a long keeper or staple, f, attached to the lower side of the front bar of the frame C. With this construction the connection of the lever W and the pitman d will be unaffected by the various movements of the said lever and pitman. The lower end of the pitman d is enlarged and slotted to receive the end of a slotted coupling-block, g, to which it is hinged by a bolt passing through the sides of the said coupling-block and between two bearing-blocks, h, placed in the outer end of the slot in the said coupling-block.

In the forward end of the slotted coupling-block g are placed two bearing-blocks, i, between which passes a bolt attached to the end of the sickle-bar j, and a bracket, k, attached to the said sickle-bar near its end. The two pairs of bearing-blocks h i are forced apart to take up the wear of a wedge-key, i'.

The sickle-bar j works in a recess in the middle part of the inner shoe, l, and in a groove in the finger-bar m, and its outer end enters a slot in the outer shoe, n, which is secured to the outer end of the finger-bar m by a bolt, o. The bolt o is swiveled at its ends, and has a screw-thread upon its middle part, which passes through a screw-hole in the end of the finger-bar m, so that the outer end of the finger-bar can be raised and lowered by turning the said swiveled bolt o. The upper end of the bolt o is squared for convenience in turning it.

The outer shoe, n, is provided in the ordinary manner with a track-clearer, p, for moving the cut grass back a little from the standing grass to clear a track for the drive-wheel at the next passage of the machine.

The inner shoe, l, is placed directly in front of the drive-wheel, so as to travel in the track opened by the clearer p, and has a slot in its forward end to receive a small wheel, q, the journals of which revolve in short vertical slots formed in the said shoe at the opposite sides of the slot for the said wheel q. The inner shoe, l, and the cutter-bar, j m, are pushed forward by the push-rods r s t. The forward ends of the two push-rods s t are brought together, and are hinged to the rear end of the shoe l by a forked-headed bolt, u, swiveled to the said shoe. The rear ends of the push-rods s t are hinged to forked-headed bolts v, swiveled to the end parts of the rear cross-bar of the frame C, or to supports attached to the said frame. The forward end of the push-bar r is bent downward, and is hinged to the end of a short bar, w, attached to the upper side of the forward part of the shoe l, just in the rear of the wheel q. The rear end of the push-bar r is hinged to the slotted or U-shaped coupling-block x, which is swiveled by a bolt or rivet to a slotted or U-shaped coupling-block, y, which is hinged by a bolt to the outer end of the lever z. The lever z is hinged to the forked head of a bolt, 1, which is swiveled to the projecting end of the rear cross-bar of the frame C.

To the inner end of the lever z is hinged the rear end of the rod 2, the forward end of which is hinged to the lever 3. The lever 3 is hinged to a side bar of the frame C or to a support attached to the said frame, and has a number of holes formed through it to receive the end of the connecting-rod 2, so that the said end of the rod 2 can be adjusted higher or lower to regulate the throw of the lever z, and the consequent movement of the push-rod r.

The lever 3 is provided with a sliding pawl, 4, hinged to the short arm of the small bent lever 5, hinged at its angle to the said lever 3. The pawl 4 is held down by a spiral spring, 6, to engage with the teeth of a ratchet-plate, 7, attached to the side bar of the frame C. By this construction the push-rod r also serves as a tilting-rod to raise and lower the forward end of the shoe l, and thus raise and lower the forward edge of the cutter-bar j m, the pawl 4 and the ratchet-plate 7 holding the said cutter-bar securely in any position into which it may be adjusted.

To the upper side of the middle part of the outer side of the inner shoe, l, is attached by bolts or rivets the middle part of a cross-bar, 8, which is further secured to the said shoe $l$ by a bolt, 9, attached to it and to the middle part of the shoe, and against which the rear side of the inner end of the sickle-bar $j$ rests.

In the arms of the cross-bar 8 are formed a number of holes to receive small eyebolts 10, to the eyes of which are attached the lower ends of two short chains, 11. The chains 11 pass up through a guide-loop attached to the lower side of the projecting end of the front cross-bar of the frame C, and are attached to the upper ends of the curved faces of the segments 12 13, which faces are grooved to keep the said chains in place upon them. The segments 12 13 are pivoted eccentrically to supports 14, attached to the projecting end of the front cross-bar of the frame C in such positions that the said segments, when swung forward, will rest against the forward side of the said cross-bar and when swung back will rest upon its upper side.

Upon the outer segment, 12, is formed, or to it is attached, a lever, 15, by means of which it is operated. To the lever 15 is attached a stop-block, 16, against a shoulder of which rests the end of a short arm, 17, formed upon or attached to the inner segment, 13, where it is locked in place by a pawl, 18, which slides through a guide-hole in the stop-block 16 and enters a socket in the end of the arm 17. The pawl 18 is held down by a spiral spring, 19, and its upper end is hinged to the end of a small bent lever, 20, which is pivoted at its angle to the lever 15. With this construction, by operating both segments 12 13 by means of the lever 15, the shoe $l$, and with it the cutter and finger bars $j$ $m$, will be raised from the ground, and by releasing the segment 13 and operating the segment 12 the outer side of the shoe $l$ will be raised, raising the cutter and finger bars $j$ $m$ into an inclined position.

To the side of the segment 13 is attached a ratchet-plate, 21, with the teeth of which engages the pawl 22, attached to the outer end of the short shaft 23. The shaft 23 works in bearings attached to the inner side of the front cross-bar of the frame C, and rising above the said frame, and to the inner end of the said shaft 23 is attached a foot-lever, 24, so that the driver can withdraw the pawl 22 from the ratchet-plate 21 by operating the lever 24 with his foot. The pawl 22 is held down upon the ratchet-plate 21 by a spiral spring, 25, attached to the said pawl, and to an eye formed upon the head of the bolt that pivots the segments 12 13 to their supports 14, or to some other suitable part of the machine.

To an arm, 26, rigidly attached to the inner end of the finger-bar $m$, is connected by a double-hook connection, 27, the forwardly-curved lower end of a lever, 28, the middle part of which is made square and passes through the square eye of an eyebolt, 29, swiveled to the forward part of the side bar of the frame C. With this construction, by operating the lever 28, the cutter and finger bars $j$ $m$ can be swung back to the side of the drive-wheel A and swung forward into working position, the swiveled eyebolt 29 serving as a fulcrum to the said lever at whatever height from the ground the shoe $l$ and cutter and finger bars $j$ $m$ may be. When the cutter and finger bars $j$ $m$ are swung back their rear ends are supported upon a hook or step, 58, attached to the rear part of the frame C.

The cutter and finger bars $j$ $m$ are locked in either position by a pin placed in a square hole in the cross-bar 8 and a larger hole in the shoe $l$, so that the said pin can never be drawn out fully, its lower end being made larger than the hole through the cross-bar 8. The pin is raised to allow the cutter and finger bars $j$ $m$ to be swung back or forward by means of a cord attached to it and attached at its upper end to the lever 15. The inner side of the shoe $l$ is held down while its outer side and the cutter and finger bars $j$ $m$ are being raised by a rod, 30, the lower end of which is hinged to the inner rear corner of the said shoe $l$ by an eyebolt or other suitable means. The upper part of the rod 30 passes through a hole in a bar, 31, the outer end of which is swiveled to the head of a bolt, 32, which is swiveled to the front cross-bar of the frame C. The other end of the bar 31 projects over the side bar of the frame C and rests upon a spring, 33, attached to the said side bar. With this construction, when the inner side of the shoe $l$ is to be held down, the driver presses down the inner end of the bar 31 with his foot, which causes the said bar to bind upon the rod 30, and thus hold the said rod 30 down. When the driver withdraws his foot from the end of the bar 31 the said end is raised by the spring 33, bringing the said bar 31 into a horizontal position and allowing the rod 30 to play up and down freely.

To the side bar of the frame C is attached a horizontal bracket, 34, the rear arm of which is parallel or nearly parallel with and over or near the axle B, and has a number of holes formed through it to receive the rear end of the rod 35. The forward end of the rod 35 is connected with the center of the double-tree 36, or with an arm 37, formed upon or attached to the rear side of the said double-tree at its center. The double-tree 36 is placed between the tongue 38 and the hammer-strap 39, and is kept in place by two bolts, 40, attached to the said tongue and hammer-strap. The rear bolt 40 passes through a short slot in the double-tree 36 and arm 37, and the forward bolt 40 passes through a staple, 41, attached to the center of the forward side of the said double-tree 36. By this construction the draft is sustained by the draw-rod 35, and by adjusting the said rod 35 upon the bracket 34 the side draft of the machine can be accurately balanced.

To the opposite side of the rear part of the tongue 38 are attached the forward ends of two braces, 42, which are curved outward and rearward, so that their rear ends and the rear end of the tongue 38 will be in line. The rear ends of the tongue 38 and of the braces 42 are hinged to the slotted heads of three bolts, 43, attached to the forward cross-bar of the frame C, so that the tongue will be connected with the frame by a firm and flexible connection.

To the middle part of the front cross-bars of the frame C is attached a plate, 44, in the lower side of which is formed an annular groove to receive an annular projection formed upon or attached to the upper side of the plate 45, formed upon or attached to the upper ends of the two standards 46, to and between the lower ends of which is pivoted the caster-wheel 47.

To the center of the plate 45 is attached, or upon it is formed, a spindle, 48, which passes up through a hole in the center of the plate 44, and between the front cross-bar of the frame C and a half-bearing, 49, bolted to the said cross-bar, and has a nut, 50, screwed upon its upper end, so that the caster-wheel will be firmly and strongly connected with the frame C, and will securely support the forward part of the machine. With this construction the caster-wheel, being in the rear of the line of the cutter-bar, will not interfere with the proper operation of the cutter-bar in passing over dead-furrows, water-drains, and other uneven surfaces.

To the rear part of the frame C is attached a stationary platform, 51. The forward platform, 52, is movable and is hinged at its forward edge to the forward cross-bar of the frame C, so that the said platform can be readily turned up to give access to the mechanism located beneath it.

To the rear middle part of the platform 52 is attached the lower end of the standard 53, the upper end of which is rounded and passes through two bearings, 54, attached to the front and rear parts of the lower side of the driver's seat 55.

To the upper part of the standard 53, between the bearings 54, is attached the center of a spring, 56, by a set-screw, 57, the said spring being so formed that its ends rest against the seat 55. With this construction the driver's seat will be held in a horizontal position as the machine inclines to either side in passing over uneven ground.

In working the machine the lever 15 and the segments 12 13 can be used as a tilting-lever by pressing the foot upon the lock 31, and thus holding the rod 30, and with it the rear part of the shoe $l$, down, while the forward part of the said shoe, and with it the cutters and guard-fingers, is raised by operating the said lever 15 and segments 12 13.

Having thus described my invention, I claim as new and desire to secure by Letters Patent—

1. In a mower or reaper, the combination, with the lever W, having round tenon upon its end, and the pitman $d$, having round tenon upon its end, of the swiveled and forked coupling-block Y, the slotted and swiveled coupling-block Z, the bolt $b$, the pair of bearing-blocks $a$, and the wedge-key $c$, substantially as herein shown and described, whereby the lever and pitman can work freely without affecting the coupling, as set forth.

2. In a mower or reaper, the combination, with the forked lower end of the pitman $d$ and the end of the sickle-bar $j$, having bracket $k$, of the slotted coupling-block $g$, having two pairs of bearing-blocks, $h$ $i$, and their wedge-key $i'$, substantially as herein shown and described, whereby wear can be compensated for and the various movements of the pitman and sickle-bar permitted without affecting the operation, as set forth.

3. In a mower or reaper, the combination, with the outer shoe, $n$, and finger-bar $m$, of the swiveled bolt $o$, substantially as herein shown and described, whereby the outer end of the finger-bar can be readily raised and lowered, as set forth.

4. In a mower or reaper, the combination, with the rear end of the inner shoe, $l$, carrying the cutter and finger bars $j$ $m$, and the frame C, of the two hinged push-rods $s$ $t$, substantially as herein shown and described, whereby the shoe and the cutter-bar are forced forward, as set forth.

5. In a mower or reaper, the combination, with the forward end of the inner shoe, $l$, carrying the cutter and finger bars $j$ $m$, of the push-rod $r$, the lever $z$, the connecting-rod 2, and the lever 3, ratchet 7, and pawl 4 5 6, substantially as herein shown and described, whereby the said push-rod can be used as a tilting-rod, as set forth.

6. In a mower or reaper, the combination, with the pivoted finger-bar $m$, having arm 26, of the lever 28, the double-hook connection 27, and the square-eyed fulcrum-bolt 29, substantially as herein shown and described, whereby the cutter-bar can be swung forward and back, as set forth.

7. In a mower or reaper, the combination, with the rear inner corner of the inner shoe, $l$, and the frame C, of the hinged rod 30, the perforated swiveled locking-bar 31, the swiveled eyebolt 32, and the spring 33, substantially as herein shown and described, whereby the inner side of the shoe can be held down, as set forth.

8. In a mower or reaper, the combination, with the inner shoe, $l$, and the frame C, of the perforated cross-bar 8, the two chains 11, the eccentric segment 12, having lever 15, stop-block 16, and pawl 18 19 20, and the corresponding eccentric segment, 13, having socket-arm 17, substantially as herein shown and described, whereby the shoe and cutter-bar can be raised bodily or inclined, as set forth.

9. In a mower or reaper, the combination, with the eccentric segments 12 13 and the frame C, of the ratchet-plate 21, the lever-pawl 22 23 24, and the spring 25, substantially as herein shown and described, whereby the said segments, and with them the shoe $l$ and the cutter and finger bars $j$ $m$, can be secured in place, as set forth.

10. In a mower or reaper, the combination, with the frame C, the tongue 38, and the hammer-strap 39, of the bracket 34, the draw-rod 35, the double-tree 36, having arm, slot, and staple, and the two bolts 40, substantially as herein shown and described.

11. In a mower or reaper, the combination, with the seat-standard 53, having rounded upper end, and the seat 55, of the bearing 54, spring 56, and set-screw 57, substantially as herein shown and described, whereby the seat will remain horizontal should the machine incline toward either side, as set forth.

HENRY A. HYLE.

Witnesses:
ELMER J. PARKER,
MARK J. JEWETT.